US010455409B2

(12) United States Patent
Hurtta

(10) Patent No.: US 10,455,409 B2
(45) Date of Patent: Oct. 22, 2019

(54) POLICY AND CHARGING CONTROL FOR GROUPS

(71) Applicant: NOKIA SOLUTIONS AND NETWORKS OY, Espoo (FI)

(72) Inventor: Tuija Helena Hurtta, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/537,614

(22) PCT Filed: Dec. 18, 2014

(86) PCT No.: PCT/EP2014/078432
§ 371 (c)(1),
(2) Date: Jun. 19, 2017

(87) PCT Pub. No.: WO2016/096013
PCT Pub. Date: Jun. 23, 2016

(65) Prior Publication Data
US 2018/0041892 A1 Feb. 8, 2018

(51) Int. Cl.
H04W 8/18 (2009.01)
H04W 76/10 (2018.01)
(Continued)

(52) U.S. Cl.
CPC ......... H04W 8/186 (2013.01); H04L 12/6418 (2013.01); H04L 41/0893 (2013.01);
(Continued)

(58) Field of Classification Search
USPC .............. 455/500, 403, 405, 406, 450–455
See application file for complete search history.

(56) References Cited

U.S. PATENT DOCUMENTS

2011/0158090 A1* 6/2011 Riley .................. H04L 12/14 370/230
2012/0124229 A1* 5/2012 Sahu .................. H04W 76/10 709/228
(Continued)

FOREIGN PATENT DOCUMENTS

EP 2 566 197 A1 3/2013
WO WO 2014/053197 A1 4/2014

OTHER PUBLICATIONS

3GPP TS 23.203 V13.1.0 (Sep. 2014); 3rd Generation Partnership Project; Technical Specification Group Services and System Aspects; Policy and charging control architecture (Release 13).
(Continued)

Primary Examiner — Fayyaz Alam
(74) Attorney, Agent, or Firm — Squire Patton Boggs (US) LLP

(57) ABSTRACT

Policy and charging control for groups It is provided a method, comprising checking whether a first data connection to be established belongs to a predefined group of data connections; supervising whether a group session to a steering device is established, wherein the group session is dedicated to the group; prohibiting, if the first data connection belongs to the group and the group session is established, an apparatus performing the method from establishing a connection session to the steering device, wherein the connection session is dedicated to the first data connection only.

4 Claims, 7 Drawing Sheets

(51) Int. Cl.
| | |
|---|---|
| H04L 12/24 | (2006.01) |
| H04L 12/64 | (2006.01) |
| H04W 4/08 | (2009.01) |
| H04W 4/70 | (2018.01) |
| H04W 76/18 | (2018.01) |
| H04W 48/02 | (2009.01) |
| H04W 76/15 | (2018.01) |
| H04W 88/16 | (2009.01) |
| G06F 21/44 | (2013.01) |
| H04W 76/22 | (2018.01) |
| H04W 76/32 | (2018.01) |
| H04W 76/40 | (2018.01) |
| H04W 76/12 | (2018.01) |

(52) U.S. Cl.
CPC ............... *H04W 4/08* (2013.01); *H04W 4/70* (2018.02); *H04W 76/10* (2018.02); *H04W 76/18* (2018.02); *G06F 21/44* (2013.01); *H04W 48/02* (2013.01); *H04W 76/12* (2018.02); *H04W 76/15* (2018.02); *H04W 76/22* (2018.02); *H04W 76/32* (2018.02); *H04W 76/40* (2018.02); *H04W 88/16* (2013.01)

(56) References Cited

U.S. PATENT DOCUMENTS

2015/0245196 A1* 8/2015 Rivas Molina ....... H04W 8/186
 370/259
2015/0281465 A1* 10/2015 Mo .................... H04L 41/5067
 455/405

OTHER PUBLICATIONS

3GPP TS 23.401 V13.0.0 (Sep. 2014); 3rd Generation Partnership Project; Technical Specification Group Services and System Aspects; General Packet Radio Service (GPRS) enhancements for Evolved Universal Terrestrial Radio Access Network (E-UTRAN) access (Release 13).

3GPP TS 32.251 V12.7.0 (Sep. 2014); 3rd Generation Partnership Project; Technical Specification Group Services and System Aspects; Telecommunication management; Charging management; Packet Switched (PS) domain charging (Release 12).

3GPP TS 32.299 V12.6.0 (Sep. 2014); 3rd Generation Partnership Project; Technical Specification Group Services and System Aspects; Telecommunication management; Charging management; Diameter charging applications (Release 12).

International Search Report & Written Opinion dated Oct. 1, 2015 corresponding to International Patent Application No. PCT/EP2014/078432.

Juniper Networks, "Solution for Group based Charging/policing/addressing," 3GPP Draft; S2-122305, SA WG2 Meeting #91, Kyoto, Japan, May 21-25, 2012, May 15, 2012, XP050632808.

3GPP TR 23.887 V12.0.0 (Dec. 2013), Technical Report, 3rd Generation Partnership Project; Technical Specification Group Services and System Aspects; Study on Machine-Type Communications (MTC) and other mobile data applications communications enhancements (Release 12), Dec. 20, 2013, pp. 1-151, XP050729146.

Feb. 18, 2019 Communication pursuant to Article 94(3) EPC issued in European Patent Application No. 14820834.1.

* cited by examiner

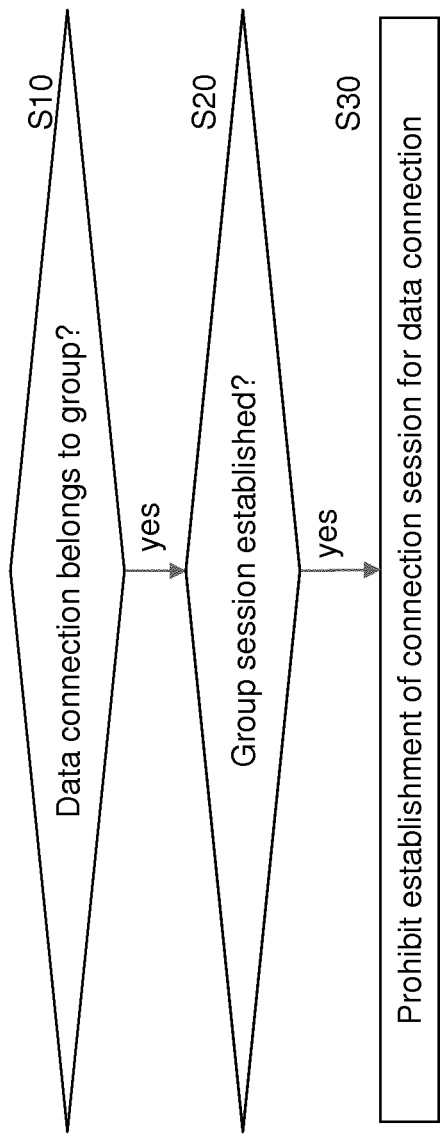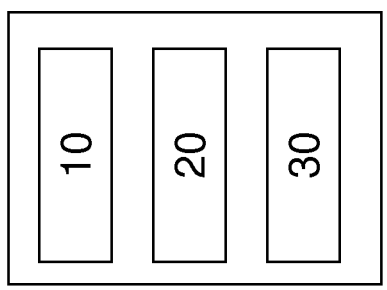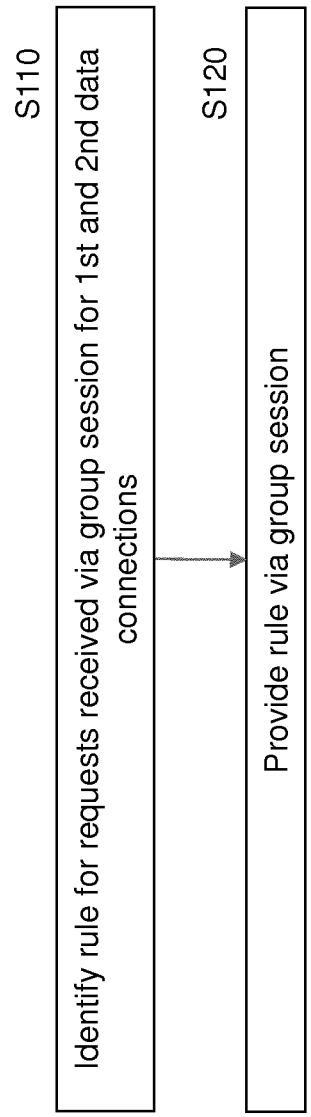

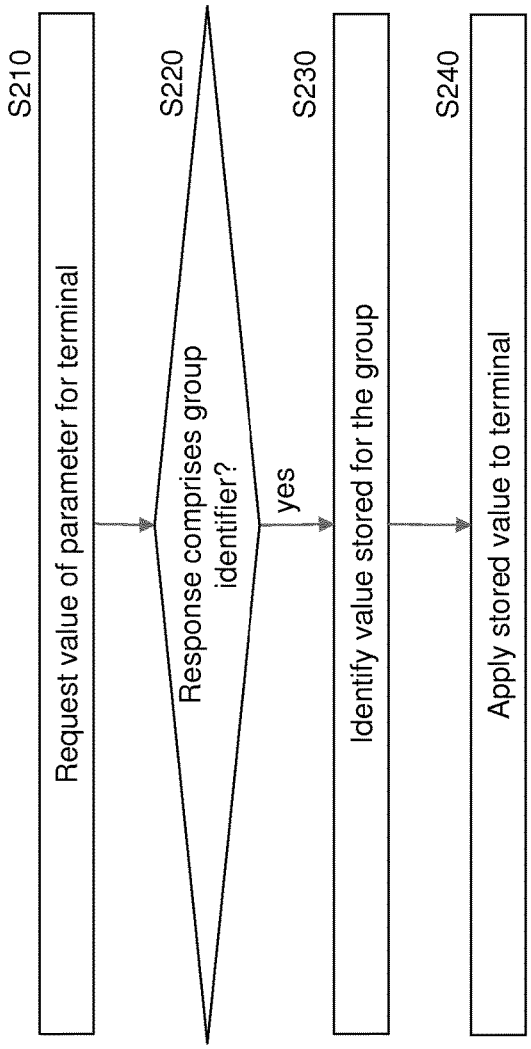
Fig. 10
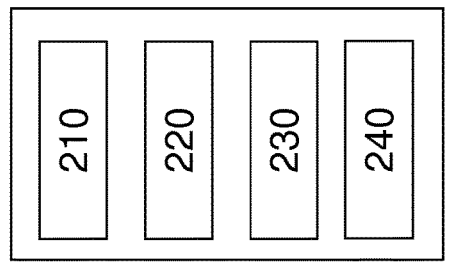
Fig. 9
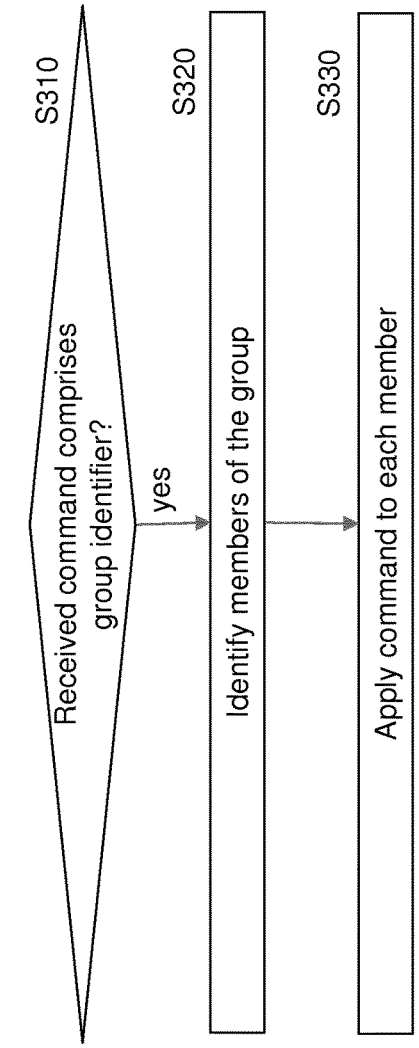
Fig. 12
Fig. 11

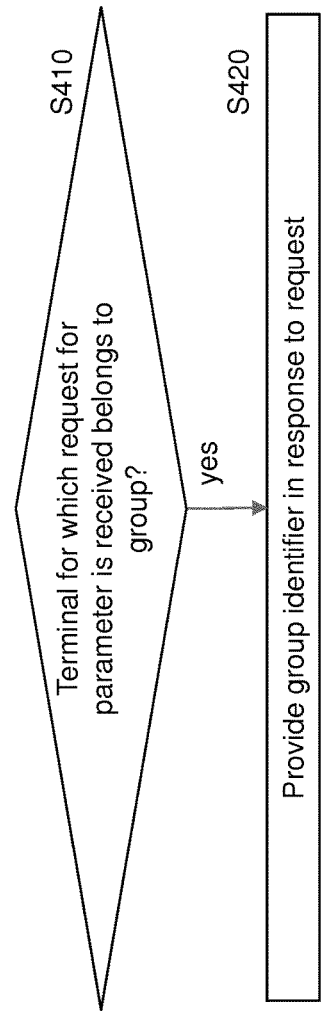
Fig. 14
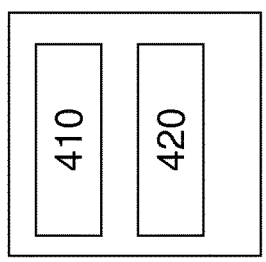
Fig. 13
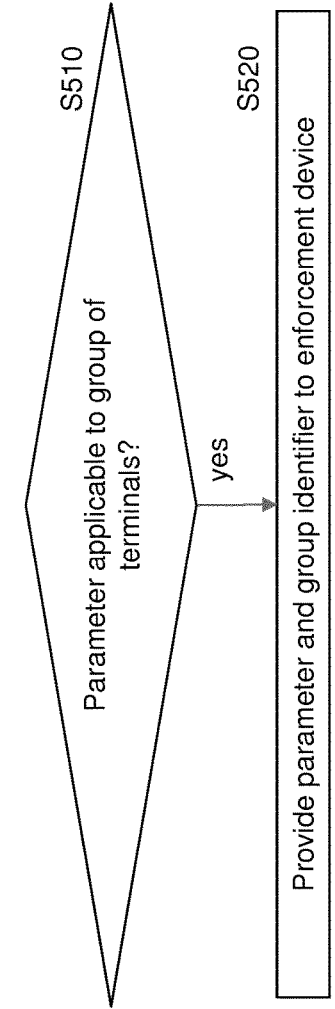
Fig. 16
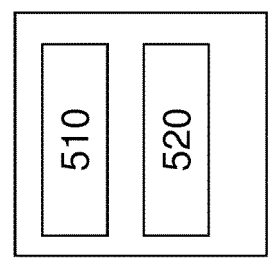
Fig. 15
Fig. 17

POLICY AND CHARGING CONTROL FOR GROUPS

FIELD OF THE INVENTION

The present invention relates to an apparatus, a method, and a computer program product related to data communication. More particularly, the present invention relates to an apparatus, a method, and a computer program product related to grouping.

BACKGROUND OF THE INVENTION

Abbreviations

3GPP Third Generation Partnership Project
AAA Authentication, Authorization, Accounting
Ack Acknowledge
AMBR Aggregate Maximum Bit-Rate
APN Access Point Name
ePDG evolved Packet Data Gateway
GGSN Gateway GPRS Support Node
GPRS General Packet Radio Service
GW Gateway
HSS Home Subscriber Server
ID Identifier
IP Internet Protocol
IP-CAN IP Connectivity Access Network
LTE Long Term Evolution
LTE-A LTE Advanced
M2M Machine to Machine (Communication)
MME Mobility Management Entity
OAM Operation, Administration, and Maintenance
OCS Online Charging System
PCC Policy and Charging Control
PCRF Policy and Charging Rules Function
PDN Packet Data Network
PGW Packet Gateway
QoS Quality of Service
SGSN Serving GPRS Support Node
SPR Subscription Profile Repository
TS Technical Specification
TWAG Trusted Wireless Access Gateway
UE User Equipment
UMTS Universal Mobile Telecommunications System
Wi-Fi Wireless Fidelity, e.g. defined by IEEE802.11 specifications and/or certified by Wi-Fi Alliance Policy and charging control (PCC) allows controlling of e.g. QoS and charging for users' PDN connections/bearers and service data flows. When a PDN connection is created for a user, the PGW contacts the PCRF which makes policy and charging control decisions and sends information on the decisions (rules) to the PGW. The PGW enforces the decisions (rules). On Gx interface between PGW and PCRF, signaling happens per PDN connection. Further details are described in the PCC standards (e.g. 3GPP TS 23.203).

For online charging, similar functionality as described above for policy and charging control applies. For online charging, the PGW contacts the OCS on Gy interface. Further details are described in the charging standards (e.g. 3GPP TS 32.251 and TS 32.299).

For subscription management, an element serving the subscriber such as the MME, SGSN, ePDG, TWAG or alike contacts the HSS/HLR to retrieve information per subscriber. This happens on interfaces such as S6a, S6d, Gr, SWm/SWx, STa/SWx or alike.

For authentication/authorization, the AAA is contacted per subscriber by elements such as the PGW, ePDG, TWAG or alike. This happens on interfaces such as S6b, SWm, STa or alike.

The PGW is the gateway towards an (external) PDN. If a terminal such as a UE is accessing multiple PDNs, there may be more than one PGW for that UE. PGW acts as an "anchor" of mobility between 3GPP and non-3GPP technologies. PGW provides connectivity from the UE to the external PDN by being the point of entry or exit of traffic for the UE. The PGW manages at least one of policy enforcement and charging support. In addition, it may perform e.g. packet filtration for users and lawful interception. Insofar, in a GPRS network, GGSN corresponds to PGW.

M2M is expected to be a huge growth opportunity for operators. The amount of M2M devices is expected to be in millions/billions. Policy and charging control as known today may not be relevant for M2M connections. Rather grouping of M2M connections and providing policy and charging control per group is of operator interest. Bitrate limitation per group has been discussed in 3GPP.

SUMMARY OF THE INVENTION

It is an object of the present invention to improve the prior art.

According to a first aspect of the invention, there is provided an apparatus, comprising establishment checking means adapted to check whether a first data connection to be established belongs to a predefined group of data connections; supervising means adapted to supervise whether a group session to a steering device is established, wherein the group session is dedicated to the group; prohibiting means adapted to prohibit, if the first data connection belongs to the group and the group session is established, the apparatus from establishing a connection session to the steering device, wherein the connection session is dedicated to the first data connection only.

The apparatus may further comprise event monitoring means adapted to monitor if a connection event occurs, wherein the connection event comprises at least one of establishing, modifying, and releasing the first data connection; requesting means adapted to request, if the group session is established and the connection event occurs, a connection rule from the steering device via the group session.

The apparatus may further comprise control monitoring means adapted to monitor whether a control rule for the group session instructs the requesting means not to request the connection rule if the connection event occurs; request inhibiting means adapted to inhibit, if the control rule instructs not to request the connection rule, the requesting means from requesting the connection rule.

The control rule may be received from the steering device or predefined.

The apparatus may further comprise instructing means adapted to instruct an enforcement device to apply the connection rule on the first data connection.

The connection rule may comprise at least one of a policy rule and a charging rule.

The apparatus may further comprise establishing means adapted to establish the group session if the first data connection belongs to the group and the group session is not established.

The apparatus may further comprise negotiating means adapted to negotiate with the steering device on an agreement to establish the group session; establishment inhibiting means adapted to inhibit the establishing means from establishing the group session if the agreement is not reached.

The apparatus may further comprise release checking means adapted to check if the first data connection is to be released; observing means adapted to observe, if the first data connection is to be released, whether a second data connection belonging to the group is established, wherein the second data connection is different from the first data connection; inhibiting means adapted to inhibit the apparatus from releasing the group session if the second data connection is established.

The apparatus may further comprise releasing means adapted to release the group session if the second data connection is not established.

The apparatus may further comprise delaying means adapted to delay the releasing of the group session for a time after the observing means observed that the second data connection is not established.

The group may comprise at least one of data connections to a network device with a same access point name, data connections of a terminal including the first data connection, data connections of terminals of a same type, data connections related to a service flow.

According to a second aspect of the invention, there is provided an apparatus, comprising identifying means adapted to identify a rule related to an event of a first data connection based on a first request received from an enforcement device via a group session and to identify the rule for the event of a second data connection based on a second request received from the enforcement device via the group session, wherein the first data connection is different from the second data connection; providing means adapted to provide the rule to the enforcement device via the group session in response to the first request and to provide the rule to the enforcement device via the group session in response to the second request.

The apparatus may further comprise negotiating means adapted to negotiate with the enforcement device on an agreement to establish the group session; establishing means adapted to establish the group session if the agreement is reached.

The apparatus may further comprise inhibiting means adapted to inhibit the establishing means from establishing the group session if the agreement is not reached.

The rule may comprise at least one of a policy rule and a charging rule.

According to a third aspect of the invention, there is provided an apparatus, comprising requesting means adapted to request a requested value of a parameter from a steering device for a terminal; checking means adapted to check if a message received in response to the request comprises an identifier of a group; identifying means adapted to identify, if the message comprises the identifier, a stored value of the parameter, wherein the stored value is stored for the group; applying means adapted to apply the stored value to the terminal.

The apparatus may further comprise monitoring means adapted to monitor if the terminal belongs to the group before the requesting means requests the requested value; supervising means adapted to supervise whether a group session to the steering device is established, wherein the group session is dedicated to the group; prohibiting means adapted to prohibit, if the terminal belongs to the group and the group session is established, the apparatus from establishing a connection session to the steering device, wherein the connection session is dedicated to the request of the parameter.

According to a fourth aspect of the invention, there is provided an apparatus, comprising monitoring means adapted to monitor if a received command comprises an identifier of a group; identifying means adapted to identify each member of the group if the command comprises the identifier; applying means adapted to apply the command to each of the members of the group.

According to a fifth aspect of the invention, there is provided an apparatus, comprising checking means adapted to check if a terminal belongs to a group, wherein a request for a parameter is received for the terminal; providing means adapted to provide, if the terminal belongs to the group, an identifier of the group in response to the request.

The apparatus may further comprise inhibiting means adapted to inhibit, if the terminal belongs to the group, the providing means from providing the parameter.

According to a sixth aspect of the invention, there is provided an apparatus, comprising checking means adapted to check if a parameter is applicable to a group of terminals; providing means adapted to provide, if the parameter is applicable to the group, the parameter to an enforcement device together with an identifier of the group.

The apparatus may further comprise inhibiting means adapted to inhibit, if the terminal belongs to the group, the providing means from providing an identifier of a terminal of the group.

According to a seventh aspect of the invention, there is provided an apparatus, comprising establishment checking circuit configured to check whether a first data connection to be established belongs to a predefined group of data connections; supervising circuit configured to supervise whether a group session to a steering device is established, wherein the group session is dedicated to the group; prohibiting circuit configured to prohibit, if the first data connection belongs to the group and the group session is established, the apparatus from establishing a connection session to the steering device, wherein the connection session is dedicated to the first data connection only.

The apparatus may further comprise event monitoring circuit configured to monitor if a connection event occurs, wherein the connection event comprises at least one of establishing, modifying, and releasing the first data connection; requesting circuit configured to request, if the group session is established and the connection event occurs, a connection rule from the steering device via the group session.

The apparatus may further comprise control monitoring circuit configured to monitor whether a control rule for the group session instructs the requesting circuit not to request the connection rule if the connection event occurs; request inhibiting circuit configured to inhibit, if the control rule instructs not to request the connection rule, the requesting circuit from requesting the connection rule.

The control rule may be received from the steering device or predefined.

The apparatus may further comprise instructing circuit configured to instruct an enforcement device to apply the connection rule on the first data connection.

The connection rule may comprise at least one of a policy rule and a charging rule.

The apparatus may further comprise establishing circuit configured to establish the group session if the first data connection belongs to the group and the group session is not established.

The apparatus may further comprise negotiating circuit configured to negotiate with the steering device on an agreement to establish the group session; establishment inhibiting circuit configured to inhibit the establishing circuit from establishing the group session if the agreement is not reached.

The apparatus may further comprise release checking circuit configured to check if the first data connection is to be released; observing circuit configured to observe, if the first data connection is to be released, whether a second data connection belonging to the group is established, wherein the second data connection is different from the first data connection; inhibiting circuit configured to inhibit the apparatus from releasing the group session if the second data connection is established.

The apparatus may further comprise releasing circuit configured to release the group session if the second data connection is not established.

The apparatus may further comprise delaying circuit configured to delay the releasing of the group session for a time after the observing circuit observed that the second data connection is not established.

The group may comprise at least one of data connections to a network device with a same access point name, data connections of a terminal including the first data connection, data connections of terminals of a same type, data connections related to a service flow.

According to a eighth aspect of the invention, there is provided an apparatus, comprising identifying circuit configured to identify a rule related to an event of a first data connection based on a first request received from an enforcement device via a group session and to identify the rule for the event of a second data connection based on a second request received from the enforcement device via the group session, wherein the first data connection is different from the second data connection; providing circuit configured to provide the rule to the enforcement device via the group session in response to the first request and to provide the rule to the enforcement device via the group session in response to the second request.

The apparatus may further comprise negotiating circuit configured to negotiate with the enforcement device on an agreement to establish the group session; establishing circuit configured to establish the group session if the agreement is reached.

The apparatus may further comprise inhibiting circuit configured to inhibit the establishing circuit from establishing the group session if the agreement is not reached.

The rule may comprise at least one of a policy rule and a charging rule.

According to a ninth aspect of the invention, there is provided an apparatus, comprising requesting circuit configured to request a requested value of a parameter from a steering device for a terminal; checking circuit configured to check if a message received in response to the request comprises an identifier of a group; identifying circuit configured to identify, if the message comprises the identifier, a stored value of the parameter, wherein the stored value is stored for the group; applying circuit configured to apply the stored value to the terminal.

The apparatus may further comprise monitoring circuit configured to monitor if the terminal belongs to the group before the requesting circuit requests the requested value; supervising circuit configured to supervise whether a group session to the steering device is established, wherein the group session is dedicated to the group; prohibiting circuit configured to prohibit, if the terminal belongs to the group and the group session is established, the apparatus from establishing a connection session to the steering device, wherein the connection session is dedicated to the request of the parameter.

According to a tenth aspect of the invention, there is provided an apparatus, comprising monitoring circuit configured to monitor if a received command comprises an identifier of a group; identifying circuit configured to identify each member of the group if the command comprises the identifier; applying circuit configured to apply the command to each of the members of the group.

According to a eleventh aspect of the invention, there is provided an apparatus, comprising checking circuit configured to check if a terminal belongs to a group, wherein a request for a parameter is received for the terminal; providing circuit configured to provide, if the terminal belongs to the group, an identifier of the group in response to the request.

The apparatus may further comprise inhibiting circuit configured to inhibit, if the terminal belongs to the group, the providing circuit from providing the parameter.

According to a twelfth aspect of the invention, there is provided an apparatus, comprising checking circuit configured to check if a parameter is applicable to a group of terminals; providing circuit configured to provide, if the parameter is applicable to the group, the parameter to an enforcement device together with an identifier of the group.

The apparatus may further comprise inhibiting circuit configured to inhibit, if the terminal belongs to the group, the providing circuit from providing an identifier of a terminal of the group.

According to a thirteenth aspect of the invention, there is provided a method, comprising checking whether a first data connection to be established belongs to a predefined group of data connections; supervising whether a group session to a steering device is established, wherein the group session is dedicated to the group; prohibiting, if the first data connection belongs to the group and the group session is established, an apparatus performing the method from establishing a connection session to the steering device, wherein the connection session is dedicated to the first data connection only.

The method may further comprise monitoring if a connection event occurs, wherein the connection event comprises at least one of establishing, modifying, and releasing the first data connection; requesting, if the group session is established and the connection event occurs, a connection rule from the steering device via the group session.

The method may further comprise monitoring whether a control rule for the group session instructs not to request the connection rule if the connection event occurs; inhibiting, if the control rule instructs not to request the connection rule, the apparatus from requesting the connection rule.

The control rule may be received from the steering device or predefined.

The method may further comprise instructing an enforcement device to apply the connection rule on the first data connection.

The connection rule may comprise at least one of a policy rule and a charging rule.

The method may further comprise establishing the group session if the first data connection belongs to the group and the group session is not established.

The method may further comprise negotiating with the steering device on an agreement to establish the group session; inhibiting the establishing of the group session if the agreement is not reached.

The method may further comprise checking if the first data connection is to be released; observing, if the first data connection is to be released, whether a second data connection belonging to the group is established, wherein the second data connection is different from the first data connection; inhibiting the releasing of the group session if the second data connection is established.

The method may further comprise releasing the group session if the second data connection is not established.

The method may further comprise delaying the releasing of the group session for a time after it was observed that the second data connection is not established.

The group may comprise at least one of data connections to a network device with a same access point name, data connections of a terminal including the first data connection, data connections of terminals of a same type, data connections related to a service flow.

According to a fourteenth aspect of the invention, there is provided a method, comprising identifying a rule related to an event of a first data connection based on a first request received from an enforcement device via a group session and to identify the rule for the event of a second data connection based on a second request received from the enforcement device via the group session, wherein the first data connection is different from the second data connection; providing the rule to the enforcement device via the group session in response to the first request and to provide the rule to the enforcement device via the group session in response to the second request.

The method may further comprise negotiating with the enforcement device on an agreement to establish the group session; establishing the group session if the agreement is reached.

The method may further comprise inhibiting the establishing of the group session if the agreement is not reached.

The rule may comprise at least one of a policy rule and a charging rule.

According to a fifteenth aspect of the invention, there is provided a method, comprising requesting a requested value of a parameter from a steering device for a terminal; checking if a message received in response to the request comprises an identifier of a group; identifying, if the message comprises the identifier, a stored value of the parameter, wherein the stored value is stored for the group; applying the stored value to the terminal.

The method may further comprise monitoring if the terminal belongs to the group before the requested value is requested; supervising whether a group session to the steering device is established, wherein the group session is dedicated to the group; prohibiting, if the terminal belongs to the group and the group session is established, an apparatus performing the method from establishing a connection session to the steering device, wherein the connection session is dedicated to the request of the parameter.

According to a sixteenth aspect of the invention, there is provided a method, comprising monitoring if a received command comprises an identifier of a group; identifying each member of the group if the command comprises the identifier; applying the command to each of the members of the group.

According to a seventeenth aspect of the invention, there is provided a method, comprising checking if a terminal belongs to a group, wherein a request for a parameter is received for the terminal; providing, if the terminal belongs to the group, an identifier of the group in response to the request.

The method may further comprise inhibiting, if the terminal belongs to the group, the providing of the parameter.

According to an eighteenth aspect of the invention, there is provided a method, comprising checking if a parameter is applicable to a group of terminals; providing, if the parameter is applicable to the group, the parameter to an enforcement device together with an identifier of the group.

The method may further comprise inhibiting, if the terminal belongs to the group, the providing of an identifier of a terminal of the group.

Each of the methods according to the thirteenth to eighteenth aspects may be a method of grouping.

According to a nineteenth aspect of the invention, there is provided a computer program product comprising a set of instructions which, when executed on an apparatus, is configured to cause the apparatus to carry out the method according to any one of the thirteenth to eighteenth aspects. The computer program product may be embodied as a computer-readable medium or directly loadable into a computer.

According to some embodiments of the invention, at least one of the following advantages may be achieved:
Signaling load on Gx interface is reduced;
Processing load on PCRF is reduced;
Processing load on PGW/GGSN is reduced.
Administration of rules on PCRF for plural terminals is simplified by grouping;
The solution is backwards compatible in several aspects:
    terminals or other network elements than PCRF and PGW (or corresponding network elements such as GGSN) need not to be modified;
    if PGW is an embodiment of the invention and connected to plural PCRFs, some of the PCRFs may not be embodiments of the invention;
    PCRF being an embodiment of the invention may be connected to PGWs being an embodiment of the invention and to PGWs not being an embodiment of the invention.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 5 shows an apparatus according to an embodiment of the invention;

FIG. 6 shows a method according to an embodiment of the invention;

FIG. 7 shows an apparatus according to an embodiment of the invention;

FIG. 8 shows a method according to an embodiment of the invention;

FIG. 9 shows an apparatus according to an embodiment of the invention;

FIG. 10 shows a method according to an embodiment of the invention;

FIG. 11 shows an apparatus according to an embodiment of the invention;

FIG. 12 shows a method according to an embodiment of the invention;

FIG. 13 shows an apparatus according to an embodiment of the invention;

FIG. 14 shows a method according to an embodiment of the invention;

FIG. 15 shows an apparatus according to an embodiment of the invention;

FIG. 16 shows a method according to an embodiment of the invention; and

FIG. 17 shows an apparatus according to an embodiment of the invention.

DETAILED DESCRIPTION OF CERTAIN EMBODIMENTS

Figure 1:
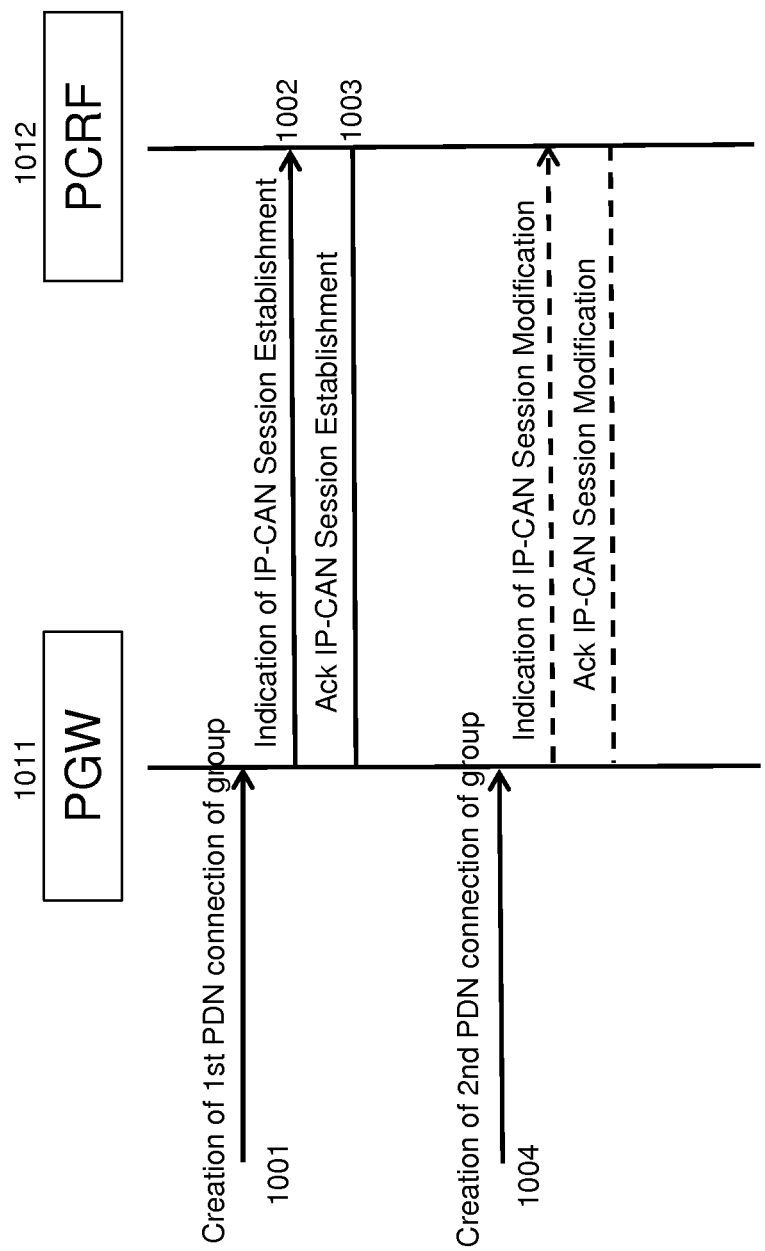
FIG. 1 shows a message flow according to an embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Hereinafter, first some embodiments of the invention are described at greater detail, which are related to grouping on the Gx interface between PGW and PCRF. Then, it is outlined how the same principles may be applied e.g. to subscription management by HSS, online charging by OCS, and authentication/authorization by AAA server.

In particular in view of the large number of M2M devices, but not limited thereto, with conventional policy and charging control, according to which signalling between the PGW and PCRF happens per PDN connection, a very high signalling load on Gx interface may be assumed.

According to some embodiments of the invention, the PGW groups some PDN connections and signals with the PCRF per group (and not per PDN connection as conventionally). One or more groups may be defined at PGW. In some embodiments of the invention, the groups are defined such that each PDN connection belongs to a single group only. If, in some embodiments of the invention, a PDN connection may belong to plural groups, pertinent preference rules may be defined at PGW.

PGW may group the PDN connections e.g. based on APN and/or based on a service flow. The PGW may also group the PDN connections based on a Group Identifier stored e.g. in the subscription information and sent to the PGW from a serving element such as the MME or SGSN when a PDN connection is created. Other options may be grouping of all PDN connections of one terminal. Some or all members of a group may be defined by definition of a terminal. If a group definition comprises a terminal, all PDN connections of this terminal are considered to belong to the group. Thus, PGW may easily group e.g. terminals of a same type such as M2M devices. The definition of a group may comprise exclusions. E.g., a group may comprise all PDN connections of a terminal except for those to a certain APN.

In the same way as negotiated for other capabilities on Gx interface, in some embodiments of the invention, the PGW may negotiate with the PCRF on support of grouping. If PGW and PCRF do not agree on the support of grouping, conventional signalling per PDN connection will be performed. If they agree on grouping, a group session may be established on Gx interface and used for the PDN connections of the group.

In some embodiments of the invention, support of grouping may be preconfigured in one or both of PGW and PCRF. For example, a range of session IDs may be reserved for group based signalling, and/or another range may be reserved for PDN connection based signalling.

In some embodiments of the invention, each time when a PDN connection is created, PGW requests dynamic policy and charging control from PCRF. In some embodiments of the invention, PGW requests dynamic policy and charging control by PCRF each time when a PDN connection is created for the first group member. In some embodiments of the invention, when a PDN connection is created for the first group member, PGW determines whether dynamic policy and charging control by the PCRF is required, and, if required, requests the same from PCRF. In the PGW, it may be configured e.g. based on APN or Group Id whether dynamic policy and charging control per group is required.

If dynamic policy and charging control is requested from PCRF, PGW signals with PCRF to create a Gx session (a group session for the group on the Gx interface, hereinafter also denoted as Gx group session). Subsequent signalling between the PGW and PCRF happens via this Gx group session.

Via the created Gx group session, the PCRF may provide e.g. maximum uplink/downlink bitrate to be enforced for the group (Group APN-AMBR). The PCRF may also provide other group specific QoS parameters e.g. QoS Class Indicator (Group QCI) or Allocation/Retention Priority (Group ARP) to be enforced for the group. In addition, the PCRF may provide e.g. maximum uplink and/or downlink bitrate or QCI to be enforced per service flow (e.g. maximum uplink and/or downlink bitrate or QCI for traffic to and/or from specific M2M servers identified with IP address(es) and/or port number(s)).

Via the created Gx group session, the PCRF may also provide e.g. parameters to be enforced for offline or online charging for the group. Examples of the parameters are charging method (offline/online) and addresses of offline/online charging elements.

If a Gx group session is established, the PCRF may indicate to the PGW on which events it wants to be notified (or not notified). In some embodiments, some or all of the conditions for notifying (not notifying) the PCRF may be predefined in the PGW. The PCRF may e.g. want to be notified when PDN connections of a group are created or released in order to adjust max bitrates. The PCRF may e.g. want to be notified only when PDN connection for first group member is created. The PCRF may want to be notified only when PDN connection for last group member is released. The PCRF may e.g. decide that it does not want to know about access changes or changes in roaming status of devices whose PDN connections belong to the group to simplify policy and charging control and to reduce signalling between the PGW and PCRF. This might be particular relevant for the expected large number of M2M devices.

When a further PDN connection belonging to the group is created a new Gx session for the further PDN connection is not created. Rather the existing Gx group session is used when there is a need to signal between the PGW and PCRF. Depending on the definition of the group, a further PDN connection may be e.g. another PDN connection of the same terminal, or a PDN connection of another terminal.

When all PDN connections are released for the group members, the Gx group session may released.

Alternatively, the Gx group session may be maintained although all PDN connections of the group are released. For example, it may be maintained for a predetermined delay time or for a delay time which is determined based on other parameters such as a load in a previous period. If after the delay time there is still no PDN connection of the group established, the Gx group session may be released. In some embodiments of the invention, an established Gx group session is never released. Due to the delay, signalling load to establish the Gx group session may be reduced.

Figure 2:
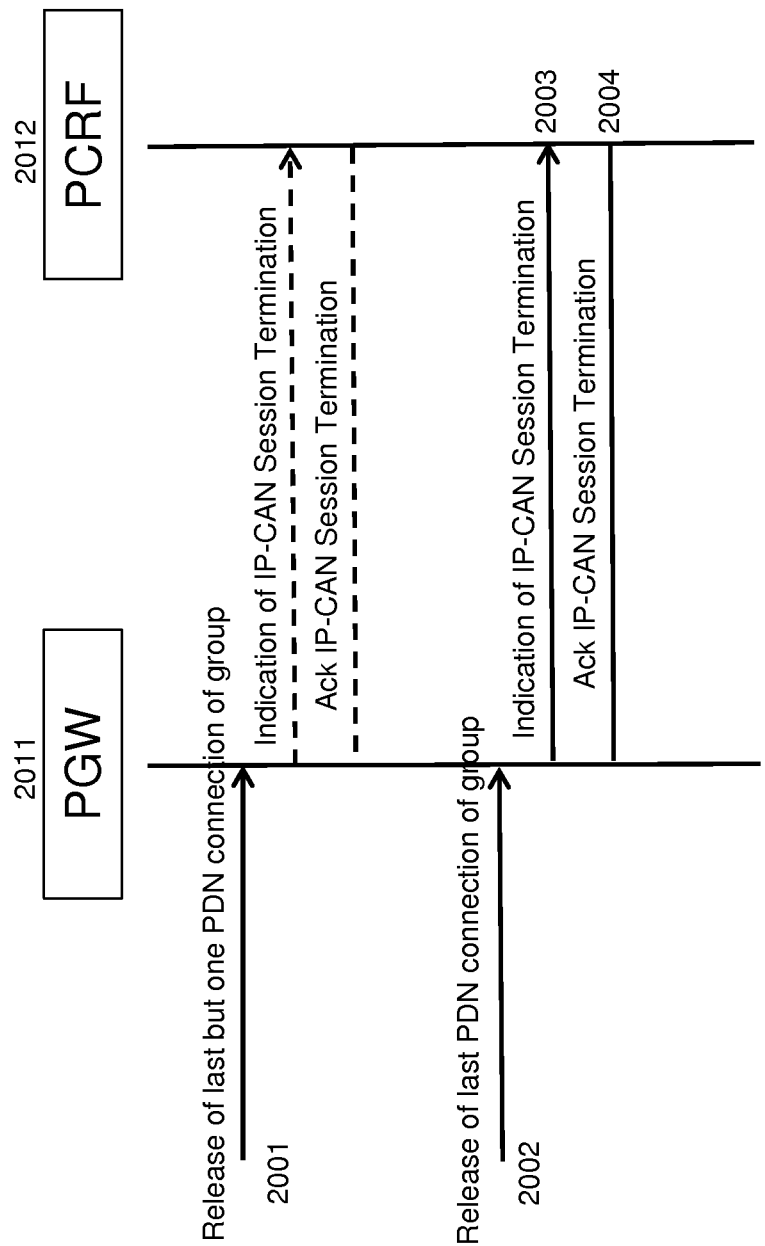
FIG. 2 shows a message flow according to an embodiment of the invention.

FIGS. 1 and 2 show message flows according to embodiments of the invention between a PGW 1011 and a PCRF 1012.

As shown in FIG. 1 related to establishment of a Gx group session, by message 1001, a first PDN connection belonging to a group is established at the PGW 1011. PGW 1011 knows that the first PDN connection belongs to the group and checks if a Gx group session is established for the group. Since the Gx group session is not established, PGW 1011 indicates to PCRF 1012 by message 1002 that a Gx group session is to be established. The establishing is indicated by message 1003 which may comprise several messages between PGW 1011 and PCRF 1012 for session creation.

Then, as indicated by message 1004, a second PDN connection belonging to the group is established at PGW 1011. PGW 1011 checks that the second PDN connection belongs to the group and checks if a Gx group session is established for the group. Since the second PDN connection belongs to the group and the Gx group session is established, PGW does not establish another Gx session (neither another Gx group session nor a Gx session dedicated to the second PDN connection) but uses the established Gx group session as needed. For example, if PCRF 1012 requests to get notified on addition of PDN connections, PGW 1011 informs PCRF 1012 on addition of the second PDN connection via the established Gx group session.

Note that, as shown by the dashed lines, PGW conventionally would create another Gx session dedicated the second PDN connection. According to some embodiments of the invention, such another Gx session is not created.

PGW may enforce group specific QoS parameters (e.g. Group APN-AMBR, Group QCI, Group ARP). PGW may do bandwidth management for all PDN connections of the group based on Group APN-AMBR. PGW may mark traffic of all PDN connections of the group based on Group QCI. PGW may perform admission control for all PDN connections of the group based on Group ARP. PGW may do offline/online charging per group based on group specific charging parameters.

As shown in FIG. 2 related to release of a Gx group session, by message 2001, a last but one PDN connection belonging to the group is released at PGW 2011. PGW 2011 and PCRF 2012 may be the same as PGW 1011 and PCRF 1012, respectively, or different therefrom. For example, if PCRF 2012 requests to get notified on deletion of PDN connections, PGW 2011 informs PCRF 2012 on the deletion of the second PDN connection via the established Gx group session.

Note that, as shown by the dashed lines, PGW 2011 would conventionally delete a Gx session dedicated to the released PDN connection. However, since there is still a PDN connection of the group established, according to some embodiments of the invention, the Gx group session is not released.

By message 2002, the last established PDN connection belonging to the group is released at PGW 2011. PGW 2011 checks that a PDN connection belonging to the group is not established any more. Hence, it indicates release of the Gx group session to PCRF 2012 by message 2003. The release is performed by message 2004 which may comprise several messages between PGW 2011 and PCRF 2012 for session release.

When there is a need to update an earlier policy and/or charging control decision, the PCRF sends a new policy and/or charging decision to the PGW via the Gx group session. This way, the PCRF may update any of the parameters provided earlier e.g. max uplink/downlink bitrate, QCI, ARP or parameters for offline/online charging. This allows e.g. controlling max uplink/downlink bitrate per group based on time (e.g. higher bitrate during the night when traffic load in the network is low, lower bitrate during busy hours when traffic load in the network is high).

PCRF may use many kinds of criteria for policy and/or charging control decisions, e.g.

subscription/group information stored in the subscriber register (e.g. SPR);

information configured in the PCRF (e.g. time based rules);

etc. (see e.g. 3GPP TS 23.203).

In some embodiments of the invention, PCRF controls charging. E.g., PCRF may control whether online or offline charging is used. If there is capability for group based charging (e.g. creation of Group CDRs), the PCRF may also control whether group based charging is used and towards which charging element (e.g. Charging GW). This is indicated to PGW in the (policy and/or) charging control decision.

Some embodiments of the invention are beneficial when limited policy and charging control is sufficient. Namely, on conventional Gx interface, there are multiple information elements which are not needed by PCRF when making group specific decisions.

In some embodiments of the invention, the rules per group are configured in the PGW, e.g. by OAM. In these embodiments, rules/parameters may be enforced by PGW without PCRF involvement. These embodiments may be more static but allow the PGW to implement group based policy enforcement by itself.

PGW may be considered as an enforcement device, and PCRF may be considered as a steering device. In general, in an enforcement device, rules and parameters received from the respective steering device are enforced on the corresponding data connection, terminal, etc.

Correspondingly to the Gx group session described in detail above, group sessions may be established from other enforcement devices (such as MME, SGSN, ePDG, TWAG) to other steering devices (such as OCS, HSS, AAA server) on their respective interfaces. All the options described hereinabove, e.g. with respect to grouping, group session establishment, group session release, usage of the group session, inhibiting the establishment for single PDN connections/terminals etc., may be applied correspondingly on the interfaces to the respective other steering device.

Figure 3:
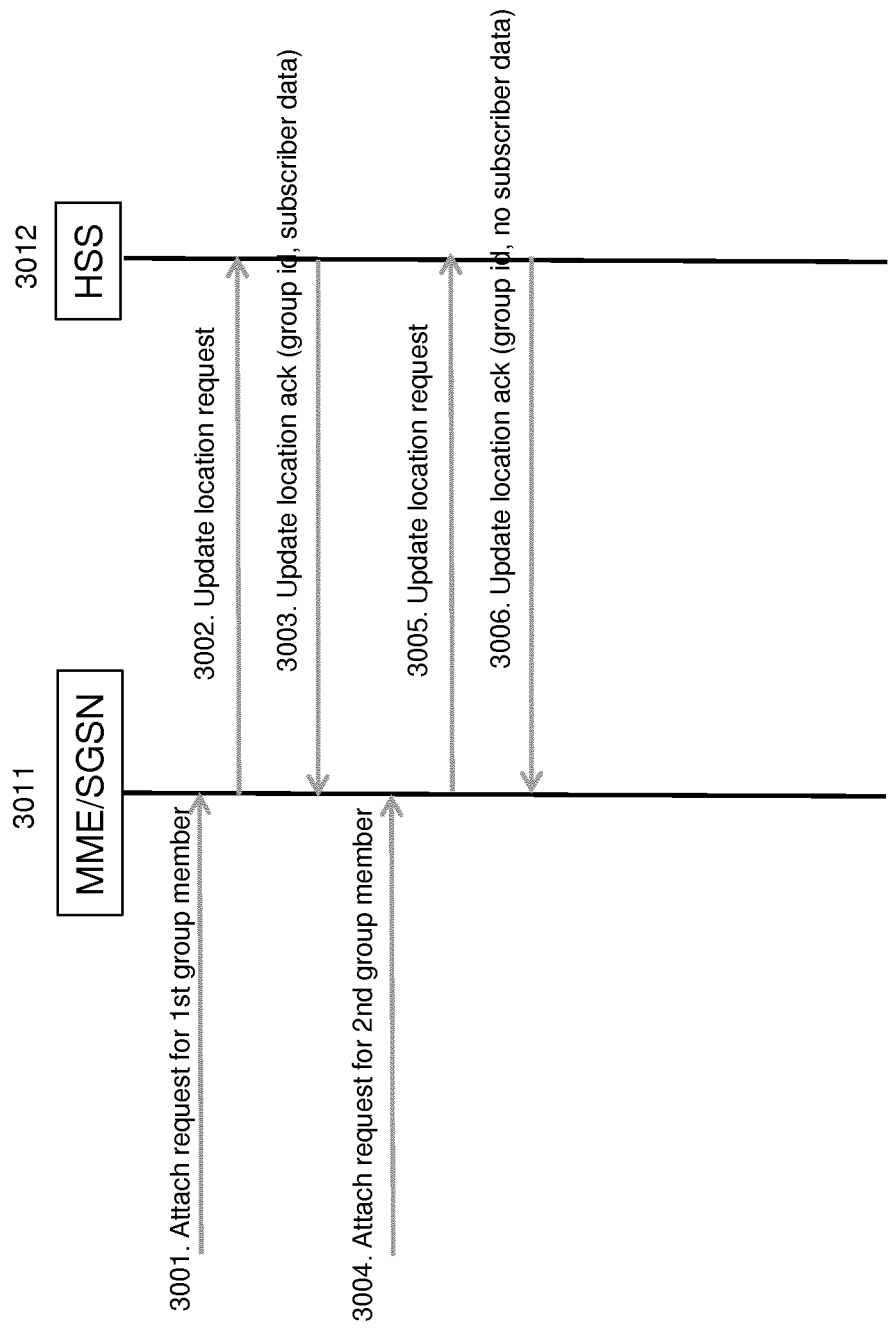
FIG. 3 shows a message flow according to an embodiment of the invention.
Figure 4:
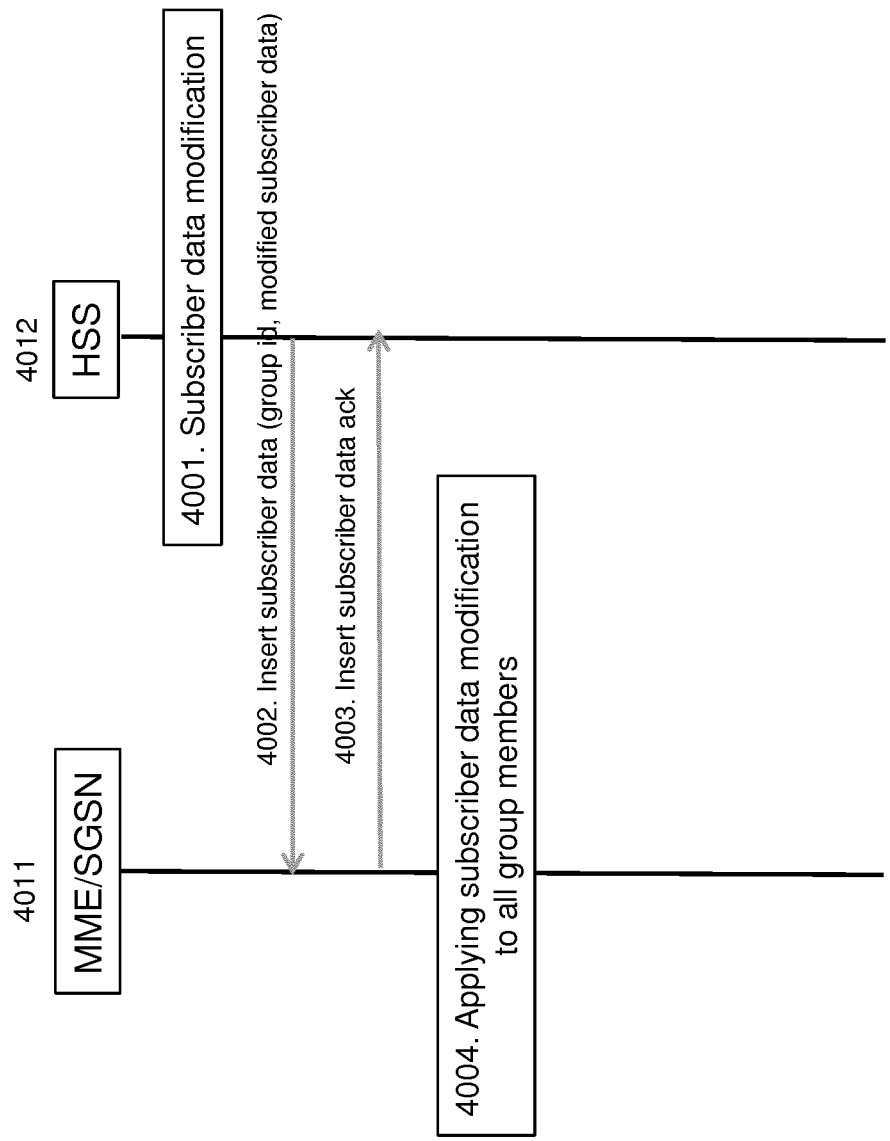
FIG. 4 shows a message flow according to an embodiment of the invention.

By FIGS. 3 and 4, it is described a way of grouping in order to reduce the amount of parameters on an interface between an enforcement device (MME 3011, 4011) and a steering device (HSS 3012, 4012). This reduction may or may not be combined with the concept of group sessions, as outlined in the different options described hereinabove.

According to FIG. 3, in message 3011, MME 3011 receives an attach request for a terminal belonging to a group. If MME 3011 knows that the terminal belongs to the group (e.g. due to some criteria stored in MME 3011), MME 3011 may set up a group session correspondingly to step 1002 of FIG. 1 and request update location request (message 3002) from HSS 3012.

However, in some embodiments, MME 3011 may not know that the terminal is a member of a group. For example, the MME 3011 may not comprise such criteria when attach request 3001 is received, or MME 3011 does not check for the criteria because a group session is not established when message 3001 is received. In these cases, MME 3011 requests update location request from HSS 3012 in a conventional way (message 3002) via a session dedicated to the terminal.

HSS 3012 updates the location of the terminal in its register and, by message 3003, HSS 3012 responds to the update location request, therein providing subscriber data and a group id. Subscriber data may be e.g. one or more of the "HSS data" defined in 3GPP TS 23.401, wherein a relation to a subscriber may be replaced by a relation to a corresponding group. Some example subscriber data are APN(s) allowed per subscriber (per group), QoS parameter(s) per APN, charging characteristics per subscriber (per group), etc. In some embodiments of the invention, due to the received group id, MME 3011 knows that the session established for message 2 is a group session and does not cancel this session after receipt of update location acknowledgment 3003. In other embodiments, the session is cancelled after receipt of message 3003.

In addition, the update location acknowledgment message 3003 may comprise criteria, which terminals and/or subscribers belong to the group. This is particularly useful if MME 3011 does not comprise the criteria when it receives the attach request 3001.

By message 3004, an attach request for another terminal is received by MME 3011. The MME 3011 checks by the criteria that the other terminal belongs to the group. If the session established for the first group member is considered as a group session, MME 3011 does not establish another session to HSS but uses the group session established for the first group member to request update location request from HSS 3012 by message 3005. However, if the session for the update location request 3002 for the first group member was cancelled, MME 3011 sets up a new session to request update location request from HSS 3012 by message 3005.

HSS 3012 may understand that the other terminal belongs to the group. For example, if a group session was established and used for message 3005, HSS 3012 knows that the other terminal belongs to the group. In some embodiments of the invention, HSS 3012 checks if the other terminal belongs to the groups based on respective criteria. HSS 3012 updates the location of the other terminal in its register and acknowledges the update location request 3005 by message 3006 via the session on which message 3005 was received. The acknowledgment 3006 may or may not comprise subscriber data but comprises the group id.

By the group id, MME 3011 knows that the subscriber data received for the first group member are applicable to the other terminal, too, and applies the subscriber data of the first group member to the other terminal. If the acknowledgment 3006 comprises subscriber data, the same are ignored.

FIG. 4 shows a case where HSS 4012 modifies subscriber data for a group (action 4001). MME (or SGSN) 4011 and HSS 4012 may be the same as MME (or SGSN) 3011 and HSS 3012, respectively, or different therefrom.

By an insert subscriber data message 4002, HSS 4012 informs MME 4011 on the modified subscriber data. Message 4002 comprises additionally the group id. Message 4002 may or may not comprise additionally a respective identifier of one or more terminals of the group. MME 4011 acknowledges message 4002 by message 4003. Due to the group id comprised in message 4002, MME 4011 applies the received modified subscriber data to all group members (action 4004).

In a corresponding way, an online charging system (as another example of a steering device) may provide to the respective enforcement device (e.g. PGW) an information on a remaining data volume for all group members when a data session for a first group member is established. Then, the enforcement device may deduct data traffic from each of the group members from the remaining data volume without necessarily involving OCS. If the account of the group is recharged, OCS may inform the enforcement device on the modified remaining data volume for the group, and the enforcement device may deduct data traffic of to group members from the modified remaining data volume. This corresponds to actions (messages) 4002 to 4004 in the case of modified subscriber data.

FIG. 5 shows an apparatus according to an embodiment of the invention. The apparatus may be an enforcement device such as a gateway (e.g. a PGW, ePDG, TWAG), a MME, a SGSN, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises establishment checking means 10, supervising means 20, and prohibiting means 30.

The establishment checking means 10 checks whether a first data connection to be established belongs to a predefined group of data connections (S10). The term "to be established" includes a case that the first data connection is still to be established at the apparatus (i.e., establishing is still ongoing) and a case that the first data connection has just been established at the apparatus.

The supervising means 20 supervises whether a group session to a steering device is established (S20). The group session is dedicated to the group for which the establishment checking means 10 checks. The steering device may be e.g. one of a policy rules function, a charging rules function, a PCRF, a HSS, an AAA server, a OCS etc.

The sequence of S10 and S20 may be interchanged. In some embodiments of the invention, the second one of the sequence may be performed only if the first one is decided affirmatively. S10 and S20 may be performed in parallel.

If the first data connection belongs to the group (S10 = "yes") and the group session is established (S20 ="yes"), the prohibiting means 30 prohibits the apparatus from establishing a connection session to the steering device (S30). The connection session is dedicated to the first data connection only (in contrast to the group session which may be used for more than one data connections).

FIG. 7 shows an apparatus according to an embodiment of the invention. The apparatus may be a steering device such as a rules function (e.g. a policy rules function, a charging rules function, or a PCRF), a HSS, an OCS, an AAA server, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises identifying means 110 and providing means 120.

The identifying means 110 identifies a rule (e.g. a connection rule) related to an event (e.g. a connection event) of a first data connection and it identifies the rule also related to the event related to a second data connection different from the first data connection (S110). The identification for the first data connection is based on a first request received from an enforcement device via a group session. The identification for the second data connection is based on a second request received from the enforcement device via the same group session. The enforcement device may be e.g. a gateway such as a PGW, ePDG, TWAG, or a MME. A connection event may be at least one of an establishment, a modification, and a release of the respective data connection. The providing means 120 provides the rule (e.g. connection rule) to the enforcement device via the group session in response to the first request and provides the rule to the enforcement device via the group session in response to the second request (S120).

FIG. 9 shows an apparatus according to an embodiment of the invention. The apparatus may be an enforcement device such as a gateway (e.g. a PGW, ePDG, TWAG), a MME, a SGSN, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises requesting means 210, checking means 220, identifying means 230, and applying means 240.

The requesting means 210 requests a value of a parameter from a steering device for a terminal (S210). E.g. the apparatus may be a MME, and the steering device may be a HSS, and the request for the value of the parameter may be an update location request, which requests subscriber data.

The checking means 220 checks if a message received in response to the request comprises an identifier of a group (S220). If the message comprises the identifier of the group (S220="yes"), the identifying means identifies a value of the parameter stored for the group (S230). Herein, the term "stored for the group" may mean that the value is marked as being stored for the group (e.g. it is stored in a register dedicated to the group), or it may mean that this value is stored for another terminal of the group.

The applying means 240 applies the stored value to the terminal (S240).

FIG. 11 shows an apparatus according to an embodiment of the invention. The apparatus may be an enforcement device such as a gateway (e.g. a PGW, ePDG, TWAG), a MME, a SGSN, or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises monitoring means 310, identifying means 320, and applying means 330.

The monitoring means 310 monitors if a received command comprises an identifier of a group (S310). If the command comprises the identifier (S310="yes"), the identifying means 320 identifies each member of the group (S320). The applying means 330 applies the command to each of the members of the group (S330). S320 and S330 may be performed one after the other for each member of the group, or S320 may be performed for some or all of the member of the group, and then, S330 is performed for these members of the group.

FIG. 13 shows an apparatus according to an embodiment of the invention. The apparatus may be a steering device such as a rules function (e.g. a policy rules function, a charging rules function, or a PCRF), a HSS, an OCS, an AAA server, or an element thereof. FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises checking means 410 and providing means 420.

The checking means 410 checks if a terminal belongs to a group (S410). In particular, the checking means checks in case a request for a value of a parameter is received for the terminal.

If the terminal belongs to the group (S410="yes"), the providing means 420 provides an identifier of the group in response to the request (S420). It may or may not provide the value of the parameter in response to the request.

FIG. 15 shows an apparatus according to an embodiment of the invention. The apparatus may be a steering device such as a rules function (e.g. a policy rules function, a charging rules function, or a PCRF), a HSS, an OCS, an AAA server, or an element thereof. FIG. 16 shows a method according to an embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises checking means 510 and providing means 520.

The checking means 510 checks if a parameter is applicable to a group of terminals (S510). E.g., the checking means may check when the parameter is modified, or it may check periodically.

If the parameter is applicable to the group, the providing means 520 provides the parameter to an enforcement device together with an identifier of the group (S520).

FIG. 17 shows an apparatus according to an embodiment of the invention. The apparatus comprises at least one processor 610, at least one memory 620 including computer program code, and the at least one processor, with the at least one memory and the computer program code, being arranged to cause the apparatus to at least perform at least one of the methods according to FIGS. 1 to 6, 8, 10, 12, 14, and 16. The communication between an enforcing device (PGW, MME, SGSN etc.) and the respective steering device (PCRF, HSS, OCS, AAA etc.) may be based on the Diameter protocol. However, it is not restricted to the Diameter protocol. E.g., Radius protocol may be employed instead.

Embodiments of the invention which employ grouping may be applied to different interfaces, in particular to diameter based interfaces. Examples of such interfaces according to the respective 3GPP specifications are Gx interface (for simpler policy control per group), S6a/S6d interfaces (for simpler subscription management per group), Gy interface, and S6b interface.

Embodiments of the invention may be employed in a 3GPP core network such as a GPRS, LTE, or LTE-A core network. They may be employed also in other packet networks such as IP networks, irrespective of the respective access, i.e. for wireline and wireless access, and in other communication networks enabling data transmission based on policy and/or charging rules.

Embodiments of the invention may be employed to packet data connections such as PDN connections as data connections. However, some embodiments of the invention may be employed to data connections different from packet data connections such as circuit switched data connections.

A terminal may be any device capable to be an endpoint of a PDN connection, such as a UE, a laptop, a tablet, a smartphone, a communicator, a M2M device, a machine, a robot, a wearable, etc. A terminal may be a server if it may be an endpoint of a PDN connection.

If not otherwise stated, one piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality. The functionality may be integral to one or few of the network elements or it may be shared or distributed among the network elements, or their cloud.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that exemplary embodiments of the present invention provide, for example an enforcement device such as a P-GW, a GGSN, an ePDG, a TWAG, a MME, or a component thereof, an apparatus embodying the same, a method for controlling and/or operating the same, and computer program(s) controlling and/or operating the same as well as mediums carrying such computer program(s) and forming computer program product(s). Furthermore, exemplary embodiments of the present invention provide, for example a steering device such as a policy rule function, a charging rule function, a PCRF, a HSS, an OCS, an AAA server, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising
at least one processor; and
at least one memory including computer program code;
the at least one memory and the computer program code configured to, with the at least one processor, cause the apparatus at least to perform:
requesting a requested value of a parameter from a steering device for a terminal;
checking if a message received in response to the request comprises an identifier of a group;
identifying, if the message comprises the identifier, a stored value of the parameter, wherein the stored value is stored for the group;
applying the stored value to the terminal.

2. The apparatus according to claim 1, wherein the apparatus is further caused to perform:
monitoring if the terminal belongs to the group before the requesting means requests the requested value;
supervising whether a group session to the steering device is established, wherein the group session is dedicated to the group;
prohibiting, if the terminal belongs to the group and the group session is established, the apparatus from establishing a connection session to the steering device, wherein the connection session is dedicated to the request of the parameter.

3. Method, comprising:
requesting a requested value of a parameter from a steering device for a terminal;
checking if a message received in response to the request comprises an identifier of a group;
identifying, if the message comprises the identifier, a stored value of the parameter, wherein the stored value is stored for the group;
applying the stored value to the terminal.

4. The method according to claim 3, further comprising:
monitoring if the terminal belongs to the group before the requested value is requested;
supervising whether a group session to the steering device is established, wherein the group session is dedicated to the group;
prohibiting, if the terminal belongs to the group and the group session is established, an apparatus performing the method from establishing a connection session to the steering device, wherein the connection session is dedicated to the request of the parameter.

* * * * *